United States Patent
Haas et al.

(10) Patent No.: US 12,043,492 B2
(45) Date of Patent: Jul. 23, 2024

(54) CONVEYOR BELT

(71) Applicant: Bizerba SE & Co. KG, Balingen (DE)

(72) Inventors: Michael Haas, Hildesheim (DE);
Philipp Troger, Hannover (DE);
Saniya Pawar, Salzgitter (DE)

(73) Assignee: Bizerba SE & Co. KG, Balingen (DE)

( * ) Notice: Subject to any disclaimer, the term of this patent is extended or adjusted under 35 U.S.C. 154(b) by 0 days.

(21) Appl. No.: 18/085,276

(22) Filed: Dec. 20, 2022

(65) Prior Publication Data
US 2023/0192409 A1    Jun. 22, 2023

(30) Foreign Application Priority Data
Dec. 21, 2021   (EP) ..................................... 21216498

(51) Int. Cl.
*B65G 21/20* (2006.01)
*B65G 15/06* (2006.01)
*B65G 15/58* (2006.01)

(52) U.S. Cl.
CPC ......... *B65G 21/2018* (2013.01); *B65G 15/06* (2013.01); *B65G 15/58* (2013.01); *B65G 2201/0252* (2013.01)

(58) Field of Classification Search
CPC ..... B65G 21/2018; B65G 15/58; G01G 19/03
USPC ...................................................... 198/690.1
See application file for complete search history.

(56) References Cited

U.S. PATENT DOCUMENTS

| | | | |
|---|---|---|---|
| 2,276,472 A | | 3/1942 | Eberhart |
| 2,881,901 A | * | 4/1959 | Zimmer ................ B65G 39/08 |
| | | | 198/690.1 |
| 3,554,131 A | | 1/1971 | Radovic |
| 3,565,234 A | * | 2/1971 | Birdsong ................ B65B 43/52 |
| | | | 198/396 |
| 3,830,353 A | * | 8/1974 | Mojden .................. B65G 47/53 |
| | | | 198/597 |
| 3,978,441 A | | 8/1976 | Sobottka et al. |
| 4,793,470 A | * | 12/1988 | Andersson ......... B65G 21/2081 |
| | | | 198/841 |
| 4,805,761 A | * | 2/1989 | Totsch ................... B65G 54/02 |
| | | | 198/690.1 |
| 4,823,931 A | * | 4/1989 | Rhodes .................. B65G 47/26 |
| | | | 198/690.1 |

(Continued)

FOREIGN PATENT DOCUMENTS

DE    1 756 772 A1    7/1968
DE    2 346 042 A1    9/1973

(Continued)

OTHER PUBLICATIONS

European Search Report dated Jun. 3, 2022 in related European application No. 21216498.2 (seven pages).

*Primary Examiner* — Mark A Deuble
(74) *Attorney, Agent, or Firm* — Kilpatrick Townsend & Stockton LLP

(57) ABSTRACT

The invention relates to a conveyor belt for transporting food products having a packaging composed of a magnetizable material, in particular cans, along a transport direction, wherein the conveyor belt comprises a belt body and a transport belt that runs around the belt body in the operation of the conveyor belt and that has an upper run and a lower run. The belt body is provided with a magnet arrangement that generates a magnetic field that acts in the direction of the upper run of the transport belt and that has a higher value at the belt entry side than at the belt exit side.

19 Claims, 2 Drawing Sheets

(56) References Cited

U.S. PATENT DOCUMENTS

Figure 1:
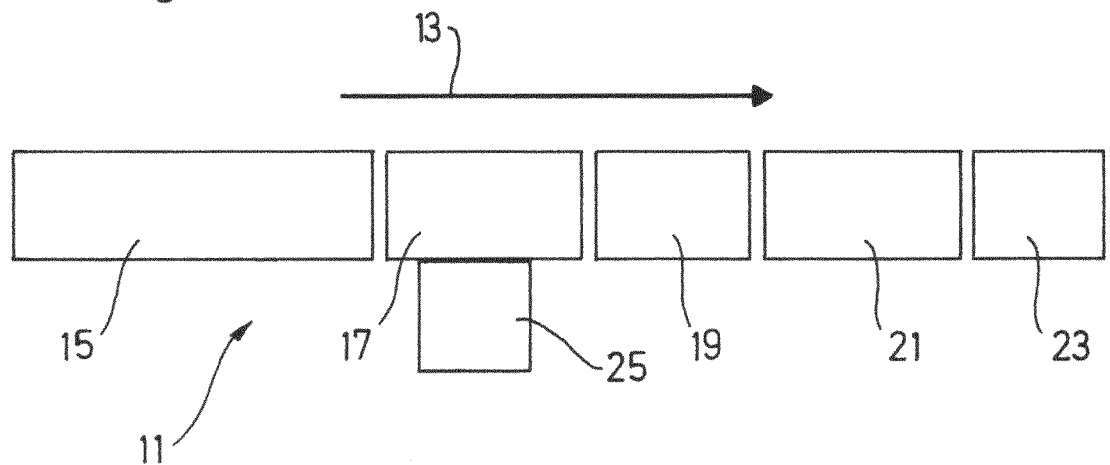

| | | | | | |
|---|---|---|---|---|---|
| 5,007,528 | A | * | 4/1991 | Hideharu | ............... B65G 15/60 198/841 |
| 5,027,942 | A | * | 7/1991 | Wallaart | ............. B65G 21/2009 198/690.1 |
| 5,819,907 | A | * | 10/1998 | Simkowski | ........ B65G 21/2036 198/689.1 |
| 9,346,623 | B2 | * | 5/2016 | Ragan | ................ B65G 21/2018 |

FOREIGN PATENT DOCUMENTS

| | | |
|---|---|---|
| DE | 103 07 601 A1 | 12/2003 |
| DE | 20 2011 051 822 U1 | 2/2013 |
| DE | 10 2013 203 459 A1 | 8/2014 |
| EP | 3 315 435 A1 | 5/2018 |
| GB | 2 075 268 A | 11/1981 |
| KR | 10-2278168 B1 | 7/2021 |

* cited by examiner

CONVEYOR BELT

This application claims priority to European Patent Application No. 21216498.2, filed Dec. 21, 2021, the disclosure of which is incorporated by reference herein.

The invention relates to a conveyor belt for transporting food products having a packaging composed of a magnetizable material, in particular cans, along a transport direction, wherein the conveyor belt comprises a belt body and a transport belt that runs around the belt body in the operation of the conveyor belt and that has an upper run and a lower run.

Conveyor belts are used in the food industry to transport food products or other goods from one production station to the next. To increase the throughput, the products follow one another closely, i.e. the spacing between consecutive products is kept as small as possible. However, this small spacing cannot be maintained when the products are fed to a weighing belt of a control scale, which is also designated as a checkweigher, or of a price labeler since always only exactly one of the products may be located on the weighing belt at any point in time to ensure a correct weight recording. It is therefore necessary to accelerate the products in front of the weighing belt individually and after one another in order to increase their mutual spacing. This is designated as separation. For this purpose, it is known to connect to a conveyor belt that is operated at a normal transport speed, a conveyor belt that is operated at a higher transport speed compared thereto, whereby the spacing of the products from one another is increased on the transition to the faster conveyor belt.

On the transition from the conveyor belt that is operated at the normal speed to the faster transport belt, the products are, however, accelerated in a jerky manner, which can have the result that a slipping is produced between the transport belt of the fast conveyor belt and the products disposed thereon so that fluctuations in the spacing of the separated products from one another may occur. Furthermore, the jerky acceleration can make itself noticeable in an at least initial instability of the products on the faster conveyor belt. This is in particular critical when dealing with products having a large height compared to their base surface, as can, for example, be the case with some cans so that they may begin to totter, in the worst case scenario, may topple over. Furthermore, this is critical when cans or the like are indeed filled, but not yet closed at the time of the weighing. If the cans are filled with a liquid and are filled relatively full, the problem of liquid leaking can occur due to the tottering. This problem is exacerbated if the liquid is an oily substance since the transport belt of the faster conveyor belt then becomes oily and the friction between the cans and the transport belt is thereby reduced and thus an even smaller entrainment effect between the transport belt and the cans is thus present.

The invention is based on the object of providing a conveyor belt of the initially mentioned kind that can ensure a precise and safe separation of cans and comparable packagings of food products.

This object is satisfied by a conveyor belt having the features of claim 1, and in particular in that the belt body is provided with a magnet arrangement that generates a magnetic field that acts in the direction of the upper run of the transport belt and that has a higher value at the belt entry side than at the belt exit side.

The conveyor belt in accordance with the invention can be used as a fast conveyor belt to which the food products are transferred from a slower conveyor belt. The cans or other packagings composed of a magnetizable material, in particular of tinplate, are attracted by the upwardly acting magnetic field of the magnet arrangement arranged beneath the upper run of the conveyor belt. A magnetic force is thus present that pulls the cans and the like against the surface of the upper run and thereby holds them securely on the running transport belt of the faster conveyor belt. A slipping or a tottering, as occurs in the prior art, can thereby be counteracted.

A large holding force is selected at the belt entry side since the slipping between the transport belt and the products disposed thereon and the instability of the food products are the greatest there due to the jerky acceleration that takes place there. A precise separation without large fluctuations in the spacings of the products from one another can hereby be achieved so that the conveyor belts can be operated at a higher speed and thereby at a higher throughput. At the belt output side, on the other hand, only a small or no holding force is required since the food products are already at least sufficiently stabilized, in particular completely stabilized, again at this point and in order to facilitate the transfer of the food products to the weighing belt or to a conveyor belt that is connected upstream of the weighing belt and that is operated at the same transport speed as the conveyor belt in accordance with the invention. When leaving the conveyor belt, the food products are then only negligibly retained or not retained at all by the magnetic force of the magnet arrangement.

Advantageous embodiments of the invention are set forth in the dependent claims, in the description, and in the drawing.

Provision is preferably made that the magnetic field adopts its highest value at the end of the conveyor belt at the belt entry side and/or that the value of the magnetic field at the belt exit side amounts to at most 20%, in particular at most 10%, of the value of the magnetic field at the belt entry side, in particular is equal to zero. As explained above, the instability of the food products is the greatest directly after the transfer so that the greatest magnetic field is also required here. At the belt exit side, on the other hand, a magnetic field is no longer required, wherein a small magnetic field can, however, generally still be present in order, in particular also in the case of short conveyor belts, to ensure a sufficient stabilization of the food products before the transfer to the weighing belt or to the next conveyor belt. Alternatively, the value of the magnetic field at the end of the conveyor belt at the belt entry side can also be increased to achieve a faster stabilization.

Provision is in particular made that the magnetic field decreases monotonically, in particular stepwise monotonically, in the transport direction from the belt entry side to the belt exit side. A design in which the magnetic field increases again in the meantime is generally possible, but is not associated with a further advantage when a greater effort is made.

In accordance with a preferred embodiment, the magnet arrangement comprises a plurality of permanent magnets that are arranged distributed over the belt body. Permanent magnets are inexpensive and are available in many different designs and sizes and can be arranged without a great effort in accordance with the desired magnetic force distribution.

The permanent magnets are preferably arranged in accordance with a pattern having a plurality of columns, in particular at least three columns, extending in the transport direction and a plurality of rows, in particular at least three rows, extending transversely thereto, in particular perpendicular thereto, with at least three columns and at least three rows each being occupied by a permanent magnet. The arrangement in columns and rows increases the clarity so that it can be quickly seen how the magnetic field distribution of the magnet arrangement is produced.

In this respect, the pattern is preferably selected such that the number of permanent magnets per row decreases monotonically, in particular stepwise monotonically, in the transport direction from the belt entry side to the belt exit side, with preferably no permanent magnets being arranged in the last row viewed in the transport direction from the belt entry side to the belt exit side. This is justified as explained above in a more general context.

The permanent magnets can in particular be arranged mirror-symmetrically with respect to a plane of symmetry that extends in the transport direction and perpendicular to the upper run of the transport belt. Due to this symmetry, an asymmetrical holding force relative to the transport direction is avoided, whereby, if required, a particularly good stabilization of the food products on the transport belt can be achieved.

The belt body can be formed in multiple parts with a frame construction and a magnet carrier, in particular a magnetizable magnet carrier, that can be exchangeably integrated into the frame construction, with the magnet carrier being provided with the magnet arrangement, with a plurality of magnet carriers being provided that differ from one another in the number and/or the arrangement of the permanent magnets and that can be integrated alternatively to one another into the frame construction. The magnet arrangement and thus the acting magnetic field can hereby be selected without a great effort, in particular depending on the type of the respective food product. In general, the magnet carrier can also consist of plastic or of a non-magnetizable metallic material.

In accordance with a preferred embodiment, the belt body, in particular a part thereof, in particular the aforementioned magnet carrier, has grooves which extend in the transport direction, in particular extend in parallel with one another, and into which the permanent magnets are inserted. A clear specification for the placement of the permanent magnets is provided by the grooves. The part of the belt body can be formed in one piece, in particular consisting of a solid material, in particular a magnetizable solid material, in particular ferritic steel. The solid material is preferably corrosion-resistant. The grooves can in particular be milled into the solid material. The permanent magnets can be placed or adhesively bonded into the grooves. These are particularly cost-effective and simple processes. Alternatively, the permanent magnets can, for example, also be fastenable in the grooves via latching means, clamping means, or pins. A fastening is not absolutely necessary in the case of a magnetizable solid material since the permanent magnets anyway adhere independently in the grooves due to their magnetic force. The arrangement of the permanent magnets can then also be easily changed.

The aforementioned magnetizable solid material can, for example, be a ferritic steel, in particular with the material number 1.4016. If the aforementioned magnet carrier or the aforementioned part of the belt body is made of a magnetizable solid material, the magnetic force of the magnet arrangement can be distributed more homogeneously over the surface of the upper run, in particular due to the walls composed of a solid material extending between the grooves, on the one hand, and can be at least partly shielded towards the lower run, on the other hand. The walls between the grooves thus not only have a mechanical function of predefining the placement of the permanent magnets, but also a function with a magnetic effect.

The permanent magnets are in particular non-switchable, pure permanent magnets. The permanent magnets are therefore not combined with coils, electromagnets or permanent magnets having coils that could, for example, be used to compensate the magnetic field of the permanent magnets. The permanent magnets are in particular arranged in a fixed position, i.e. the position and the orientation of the permanent magnets are fixed. The permanent magnets are therefore not movable, in particular not tiltable or not pivotable.

The permanent magnets can be configured as cuboid magnets. Cuboid magnets are easy to handle. The permanent magnets can be oriented with their largest edge length in the transport direction, in particular in the longitudinal direction of the aforesaid grooves, and with their smallest edge length in the direction of the upper run of the transport belt. The permanent magnets then have only have a small installation height. The edge lengths of the permanent magnets can amount to at most 40 mm, at most 20 mm, and at most 10 mm.

The permanent magnets are preferably identical. The magnetic field distribution achieved by the respective selected magnet arrangement can thereby be easily estimated without complex calculations being required. In general, permanent magnets of different strengths can, however, also be used. Stronger permanent magnets can in particular be used at the belt entry side than at the belt exit side. The permanent magnets can be arranged in one plane and/or at the same level. The magnetic field distribution achieved by the respective selected magnet arrangement can hereby also be easily estimated without complex calculations being required.

The magnetization direction of the permanent magnets preferably faces in the direction of the upper run of the transport belt. A particularly large holding force per unit volume of the permanent magnets hereby results so that the permanent magnets can be kept particularly small. The poles of adjacent permanent magnets are particularly preferably alternately oriented in the transport direction and transversely, in particular perpendicular, to the transport direction. The north poles and the south poles then each face alternately upward and downward, whereby a particularly high, uniform magnetic field results at the surface of the upper run of the transport belt. A kind of checkerboard pattern of north and south poles is produced.

Provision can be made that the belt body is provided with a Teflon coating, in particular a Teflon adhesive tape, at its side facing the upper run of the transport belt or a cover plate fastened to the belt body is provided with a Teflon coating, in particular a Teflon adhesive tape, at its side facing the upper run of the transport belt. Teflon has a particularly low coefficient of friction so that the wear of the transport belt, which is pressed against the belt body to a particular extent by the food products due to the magnetic force of the magnet arrangement, can be reduced.

The conveyor belt is in particular configured as a placing conveyor belt in which the food products are placed onto the upper run of the transport belt. The conveyor belt is therefore not a conveyor belt in which the food products are transported in a suspended manner. The conveyor belt is in particular configured as a belt conveyor in which the transport belt is configured as a single conveying belt. Accordingly, the conveyor belt is not configured as a multi-track conveyor belt and also does not have a plurality of round belts disposed next to one another, as is the case with a round belt conveyor.

The invention further relates to a checkweigher or a price labeler, comprising a conveyor belt, as is described above, a feed belt connected upstream of the conveyor belt, and a weighing belt connected downstream of the conveyor belt, wherein a control unit is provided that has an operating mode that controls the belts such that the transport speed of the conveyor belt is greater, in particular by at least a factor of 2, in particular by at least a factor of 3, than the transport speed of the feed belt and such that the transport speed of the weighing belt corresponds to the transport speed of the conveyor belt.

Figure 2:
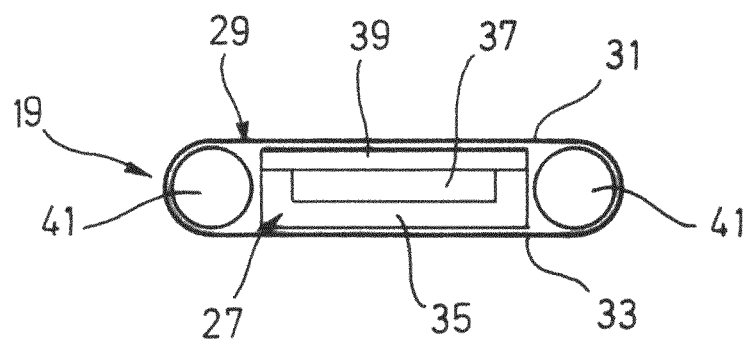
Figure 3:
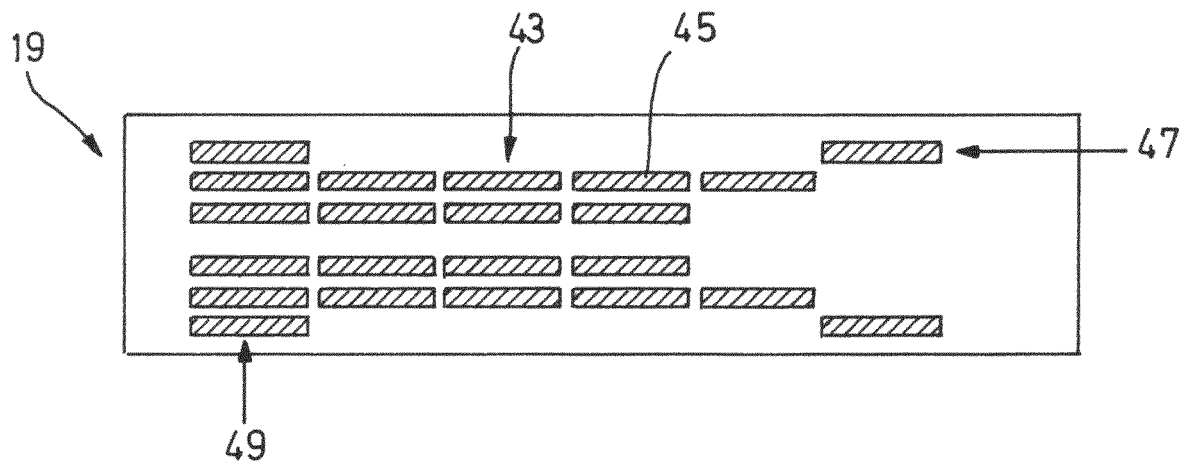
Figure 4:
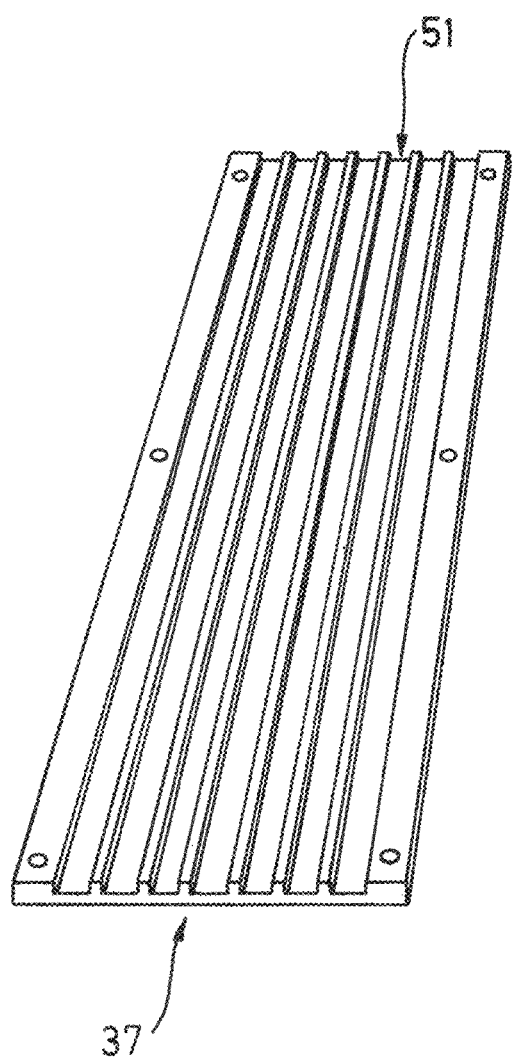
Figure 4:
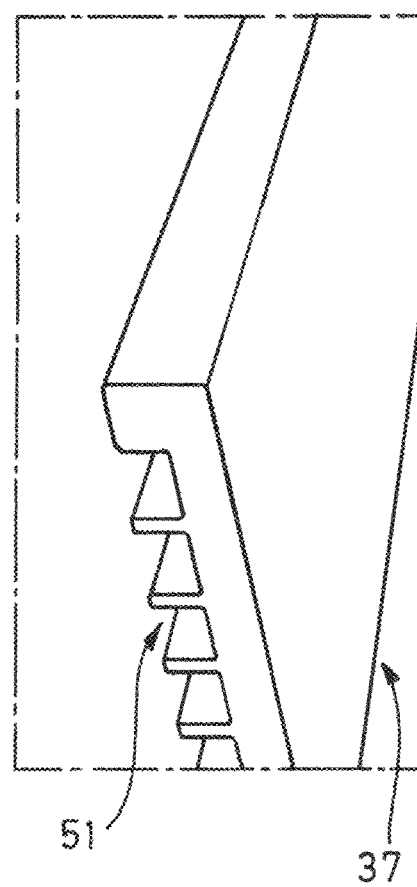

The invention will be described in the following by way of example with reference to the drawing. There are shown, in a schematic representation in each case, FIG. 1 a checkweigher in a plan view with a conveyor belt in accordance with the invention;

FIG. 2 the conveyor belt in accordance with FIG. 1 in a side view;

FIG. 3 a belt body of the conveyor belt in accordance with FIG. 1 in a plan view; and FIG. 4 a part of the belt body in accordance with FIG. 3 in two perspective views.

FIG. 1 shows a checkweigher 11 onto which food products, not shown, having a packaging composed of a magnetizable material, in particular cans, in particular composed of tinplate, are placed and are transported from a first conveyor belt 15 of a production station, which is otherwise not shown in further detail, in a transport direction 13 via a second to fourth conveyor belt 17, 19, 21 to a weighing belt 23. The cans are weighed at the weighing belt 23. Off-weight cans, i.e. cans that do not lie within an expected weight range, are then sorted out.

The second conveyor belt 17 is a conveyor belt that is combined with a printer 25 to provide the cans with a label. The second conveyor belt 17 is operated at the same transport speed of e.g. 40 m/min as the first conveyor belt 15. The third conveyor belt 19 is a conveyor belt that is operated at a higher transport speed of e.g. 160 m/min. This is necessary since the cans are output disposed closely to one another by the production station and have to be separated for the weight determination by the weighing belt 23. The cans are therefore accelerated on the transition from the second conveyor belt 17 to the third conveyor belt 19, whereby the spacing of the cans from one another is increased. The third conveyor belt 19 is also designated as a separation belt. The fourth conveyor belt 21 then transports the separated cans to the weighing belt 23 and can generally also be omitted. The fourth conveyor belt 21 and the weighing belt 23 have the same higher transport speed as the third conveyor belt 19. The aforementioned operation is made possible by a control unit, not shown, that operates the checkweigher in a corresponding operating mode.

In FIG. 2, it is shown that the third conveyor belt 19 has a belt body 27, two deflection rollers 41, of which one is driven, and a single transport belt 29 that runs around the belt body 27 in the operation of the third conveyor belt 19. The transport belt 29 comprises an upper run 31, which is also designated as the load run or the pull run, and a lower run 33 that is also designated as the empty run. At the belt body 27, a cover plate 39 is provided that is provided with a Teflon adhesive tape at its upper side to reduce the friction of the upper run 31 at the belt body 27.

The belt body 27 is provided with a magnet arrangement 43, as is shown in FIG. 3. The magnet arrangement 43 generates a magnetic field which acts in the direction of the upper run 31 of the transport belt 29 of the third conveyor belt 19 and by which the cans are attracted and are thus stably and securely held on the surface of the upper run 31 despite the jerky acceleration on the transition from the second conveyor belt 17 to the third conveyor belt 19.

The magnet arrangement 43 comprises a plurality of identical, pure permanent magnets 45 which are arranged distributed over the belt body 27 and of which only one permanent magnet 45 is provided with a reference numeral for the sake of clarity. The permanent magnets 45 are arranged in six columns 47 oriented in the transport direction 13 and in seven rows 49 oriented perpendicular to the columns 47 such that the pattern shown in FIG. 3 results that is formed mirror-symmetrically with respect to a plane of symmetry that extends in the transport direction 13 and perpendicular to the upper run 31 of the transport belt 29 of the third conveyor belt 19. Again for the sake of clarity, only one column 47 and only one row 49 are provided with a reference numeral. In the first row 49, all the columns 47 are occupied by a permanent magnet 45; in the second to fourth row 49, the inner four columns 47 are occupied; in the fifth row 49, only the two outer ones of the inner four columns 47 are occupied; in the sixth row 49, only the two outer columns 47 are occupied; and in the seventh row 49, no permanent magnets 45 are provided.

The number of permanent magnets 45 per row therefore decreases stepwise monotonically in the transport direction 13, i.e. from the belt entry side to the belt exit side. The magnetic field generated by the magnet arrangement 43 therefore adopts its highest value at the end of the third conveyor belt 19 at the belt entry side and decreases stepwise monotonically towards the end at the belt exit side, in particular to the value zero. The magnetic field value is the highest at the belt entry side since the jerky acceleration of the cans on the transition from the second conveyor belt 17 to the third conveyor belt 19 has to be compensated there, whereas no such magnetic field is required at the belt exit side.

The belt body 27 is formed in multiple parts and comprises a frame construction 35 and a magnet carrier 37 (cf. FIG. 2) which is exchangeably connectable to the frame construction 35 and to which the permanent magnets 45 are applied. A plurality of magnet carriers 37 can be provided that differ from one another in the number and/or the arrangement of the permanent magnets 45 and that are insertable alternatively to one another into the frame construction 35. In the magnet carrier 37, grooves 51 are formed (cf. FIG. 4) which extend in the transport direction 13, which extend in parallel with one another, and into which the permanent magnets 45 are inserted, in particular only placed or adhesively bonded, in a fixed position on the same plane in accordance with the pattern explained above. Again for the sake of clarity, in the two views in accordance with FIG. 4 a) and b), only one groove 51 is provided with a reference numeral in each case. The magnet carrier 37 can consist of a magnetizable solid material, in particular of ferritic steel, into which the grooves 51 are milled.

The permanent magnets 37 having dimensions of, for example, 20 mm×10 mm×5 mm are of a parallelepiped shape and are oriented with their largest edge length in the longitudinal direction of the grooves 51. With their smallest edge length, the permanent magnets 37 extend in the direction of the upper run 31 of the transport belt 29 of the third conveyor belt 19. The magnetization direction of the permanent magnets 37 in each case faces in the direction of the upper run 31. In this respect, the poles of the permanent magnets 37 alternately face upward with their south and north poles.

REFERENCE NUMERAL LIST 11 checkweigher
13 transport direction
15 first conveyor belt
17 second conveyor belt
19 third conveyor belt
21 fourth conveyor belt
23 weighing belt
25 printer
27 belt body
29 transport belt
31 upper run
33 lower run
35 frame construction
37 magnet carrier
39 cover plate
41 deflection roller
43 magnet arrangement
45 permanent magnet
47 column
49 row
51 groove

The invention claimed is:

1. A conveyor belt for transporting food products having a packaging composed of a magnetizable material along a transport direction, wherein the conveyor belt comprises a belt body and a transport belt that runs around the belt body in the operation of the conveyor belt and that has an upper run and a lower run,
wherein the belt body is provided with a magnet arrangement that generates a magnetic field that acts in the direction of the upper run of the transport belt and that has a higher value at the belt entry side than at the belt exit side, wherein the magnet arrangement comprises a plurality of permanent magnets that are arranged distributed over the belt body, wherein the belt body has grooves which extend in the transport direction and into which the permanent magnets are inserted.

2. The conveyor belt in accordance with claim 1,
wherein the magnetic field adopts its highest value at the end of the conveyor belt at the belt entry side and/or the value of the magnetic field at the belt exit side amounts to at most 20% of the value of the magnetic field at the belt entry side.

3. The conveyor belt in accordance with claim 1,
wherein the magnetic field decreases monotonically in the transport direction from the belt entry side to the belt exit side.

4. The conveyor belt in accordance with claim 1,
wherein the magnet arrangement comprises a plurality of permanent magnets that are arranged distributed over the belt body.

5. A conveyor belt for transporting food products having a packaging composed of a magnetizable material along a transport direction, wherein the conveyor belt comprises a belt body and a transport belt that runs around the belt body in the operation of the conveyor belt and that has an upper run and a lower run,
wherein the belt body is provided with a magnet arrangement that generates a magnetic field that acts in the direction of the upper run of the transport belt and that has a higher value at the belt entry side than at the belt exit side, wherein the magnet arrangement comprises a plurality of permanent magnets that are arranged distributed over the belt body,
wherein the permanent magnets are arranged in accordance with a pattern having a plurality of columns extending in the transport direction and a plurality of rows extending transversely thereto, with at least three columns and at least three rows each being occupied by a permanent magnet.

6. The conveyor belt in accordance with claim 5,
wherein the pattern is selected such that a number of permanent magnets per row decreases monotonically in the transport direction from the belt entry side to the belt exit side.

7. The conveyor belt in accordance with claim 6,
wherein no permanent magnets are arranged in the last row viewed in the transport direction from the belt entry side to the belt exit side.

8. The conveyor belt in accordance with claim 1,
wherein the permanent magnets are arranged mirror-symmetrically with respect to a plane of symmetry that extends in the transport direction and perpendicular to the upper run of the transport belt.

9. A conveyor belt for transporting food products having a packaging composed of a magnetizable material along a transport direction, wherein the conveyor belt comprises a belt body and a transport belt that runs around the belt body in the operation of the conveyor belt and that has an upper run and a lower run,
wherein the belt body is provided with a magnet arrangement that generates a magnetic field that acts in the direction of the upper run of the transport belt and that has a higher value at the belt entry side than at the belt exit side, wherein the magnet arrangement comprises a plurality of permanent magnets that are arranged distributed over the belt body,
wherein the belt body is formed in multiple parts with a frame construction and a magnet carrier that can be exchangeably integrated into the frame construction, with the magnet carrier being provided with the magnet arrangement, with a plurality of magnet carriers being provided that differ from one another in the number and/or the arrangement of the permanent magnets and that can be integrated alternatively to one another into the frame construction.

10. The conveyor belt in accordance with claim 1,
wherein a part of the belt body is formed in one piece and/or the permanent magnets are placed or adhesively bonded into the grooves.

11. The conveyor belt in accordance with claim 1,
wherein the permanent magnets are non-switchable, pure permanent magnets and/or the permanent magnets are arranged in a fixed position, i.e. the position and the orientation of the permanent magnets are fixed.

12. The conveyor belt in accordance with claim 1,
wherein the permanent magnets are configured as cuboid magnets.

13. The conveyor belt in accordance with claim 12,
wherein the permanent magnets are oriented with their largest edge length in the transport direction and with their smallest edge length in the direction of the upper run of the transport belt and/or the edge lengths of the permanent magnets amounting to at most 40 mm, at most 20 mm, and at most 10 mm.

14. The conveyor belt in accordance with claim 1,
wherein the permanent magnets are identical and/or are arranged in one plane and/or at the same level.

15. The conveyor belt in accordance with claim 1, wherein the magnetization direction of the permanent magnets faces in the direction of the upper run of the transport belt.

16. The conveyor belt in accordance with claim 15, wherein the poles of adjacent permanent magnets are alternately oriented in the transport direction and transversely to the transport direction.

17. The conveyor belt in accordance with claim 1, wherein the belt body is provided with a Teflon coating at its side facing the upper run of the transport belt or a cover plate fastened to the belt body is provided with a Teflon coating at its side facing the upper run of the transport belt.

18. The conveyor belt in accordance with claim 1, wherein the conveyor belt is configured as a placing conveyor belt in which the food products are placed onto the upper run of the transport belt; and/or wherein the conveyor belt is configured as a belt conveyor in which the transport belt is configured as a single conveying belt.

19. A checkweigher or a price labeler, comprising a conveyor belt for transporting food products having a packaging composed of a magnetizable material along a transport direction, a feed belt connected upstream of the conveyor belt, and a weighing belt connected downstream of the conveyor belt, wherein a control unit is provided that has an operating mode that controls the belts such that the transport speed of the conveyor belt is greater than the transport speed of the feed belt and such that the transport speed of the weighing belt corresponds to the transport speed of the conveyor belt, wherein the conveyor belt comprises a belt body and a transport belt that runs around the belt body in the operation of the conveyor belt and that has an upper run and a lower run, and wherein belt body is provided with a magnet arrangement that generates a magnetic field that acts in the direction of the upper run of the transport belt and that has a higher value at the belt entry side than at the belt exit side.

* * * * *